(12) United States Patent
Chopard et al.

(10) Patent No.: US 12,237,484 B2
(45) Date of Patent: Feb. 25, 2025

(54) THERMAL MANAGEMENT STRUCTURE WITH FLUID CHANNELS

(71) Applicant: HUTCHINSON, Paris (FR)

(72) Inventors: Fabrice Chopard, Saint Martin d'Heres (FR); Clément Blanchard, Amilly (FR)

(73) Assignee: HUTCHINSON, Paris (FR)

( * ) Notice: Subject to any disclaimer, the term of this patent is extended or adjusted under 35 U.S.C. 154(b) by 989 days.

(21) Appl. No.: 17/272,501

(22) PCT Filed: Sep. 2, 2019

(86) PCT No.: PCT/FR2019/052012
§ 371 (c)(1),
(2) Date: Mar. 1, 2021

(87) PCT Pub. No.: WO2020/044001
PCT Pub. Date: Mar. 5, 2020

(65) Prior Publication Data
US 2021/0320344 A1     Oct. 14, 2021

(30) Foreign Application Priority Data

Aug. 31, 2018   (FR) ..................................... 1857878

(51) Int. Cl.
*H01M 10/61* (2014.01)
*B60L 50/64* (2019.01)
(Continued)

(52) U.S. Cl.
CPC ........... *H01M 10/613* (2015.04); *B60L 50/64* (2019.02); *B60L 58/26* (2019.02); *F28D 20/02* (2013.01);
(Continued)

(58) Field of Classification Search
None
See application file for complete search history.

(56) References Cited

U.S. PATENT DOCUMENTS

2012/0196157 A1\* 8/2012 Krestel ............... H01M 10/613
429/7
2014/0287292 A1\* 9/2014 Baumgart ........... H01M 10/653
165/104.11
(Continued)

FOREIGN PATENT DOCUMENTS

CN      106252787 A     12/2016
FR      3015780 A3      6/2015
(Continued)

OTHER PUBLICATIONS

Machine translation for CN 106252787 A.\*
(Continued)

*Primary Examiner* — Jonathan G Leong
*Assistant Examiner* — Tony S Chuo
(74) *Attorney, Agent, or Firm* — Cozen O'Connor

(57) ABSTRACT

The invention relates to a structure comprising at least one thermal management element comprising: a composite body (3) containing at least one phase change material (PCM) in a structuring rigid matrix, such that the composite body is self-supporting regardless of the phase of the phase change material contained, the composite body (3) being shaped to locally externally present at least one elongated depression (11) which by itself defines a channel wall (13) suitable for the circulation of a fluid.

15 Claims, 9 Drawing Sheets

(51) Int. Cl.
*B60L 58/26* (2019.01)
*F28D 20/02* (2006.01)
*F28F 3/08* (2006.01)
*H01M 10/0525* (2010.01)
*H01M 10/613* (2014.01)
*H01M 10/625* (2014.01)
*H01M 10/6556* (2014.01)
*H01M 10/6557* (2014.01)
*H01M 10/658* (2014.01)
*H01M 10/659* (2014.01)
*H01M 50/204* (2021.01)
*H01M 50/213* (2021.01)
*H01M 50/227* (2021.01)
*H01M 50/24* (2021.01)
*H01M 50/249* (2021.01)
*H01M 50/289* (2021.01)
*B60K 6/28* (2007.10)

(52) U.S. Cl.
CPC ......... *F28F 3/086* (2013.01); *H01M 10/0525* (2013.01); *H01M 10/625* (2015.04); *H01M 10/6556* (2015.04); *H01M 10/6557* (2015.04); *H01M 10/658* (2015.04); *H01M 10/659* (2015.04); *H01M 50/204* (2021.01); *H01M 50/213* (2021.01); *H01M 50/227* (2021.01); *H01M 50/24* (2021.01); *H01M 50/249* (2021.01); *H01M 50/289* (2021.01); *B60K 6/28* (2013.01); *B60Y 2200/91* (2013.01); *B60Y 2200/92* (2013.01); *B60Y 2306/05* (2013.01); *F28F 2255/06* (2013.01); *H01M 2220/20* (2013.01)

(56) References Cited

U.S. PATENT DOCUMENTS

| | | | |
|---|---|---|---|
| 2019/0210425 A1* | 7/2019 | Azzouz | B60H 1/00328 |
| 2019/0312322 A1* | 10/2019 | Ahn | H01M 50/262 |
| 2020/0036067 A1* | 1/2020 | Mummigatti | H01M 10/625 |

FOREIGN PATENT DOCUMENTS

| | | | |
|---|---|---|---|
| FR | 3039561 A1 | 2/2017 | |
| FR | 3040210 A1 | 2/2017 | |
| FR | 3063137 A1 | 8/2018 | |
| JP | 2013214354 A * | 10/2013 | ......... H01M 10/613 |
| WO | WO2017153691 A1 | 9/2017 | |
| WO | WO2018167382 A1 | 9/2018 | |

OTHER PUBLICATIONS

Machine translation for JP 2013214354 A.*
International Patent Application No. PCT/FR2019/052012, International Search Report and Written Opinion dated Jan. 28, 2020, 11 pgs.

* cited by examiner

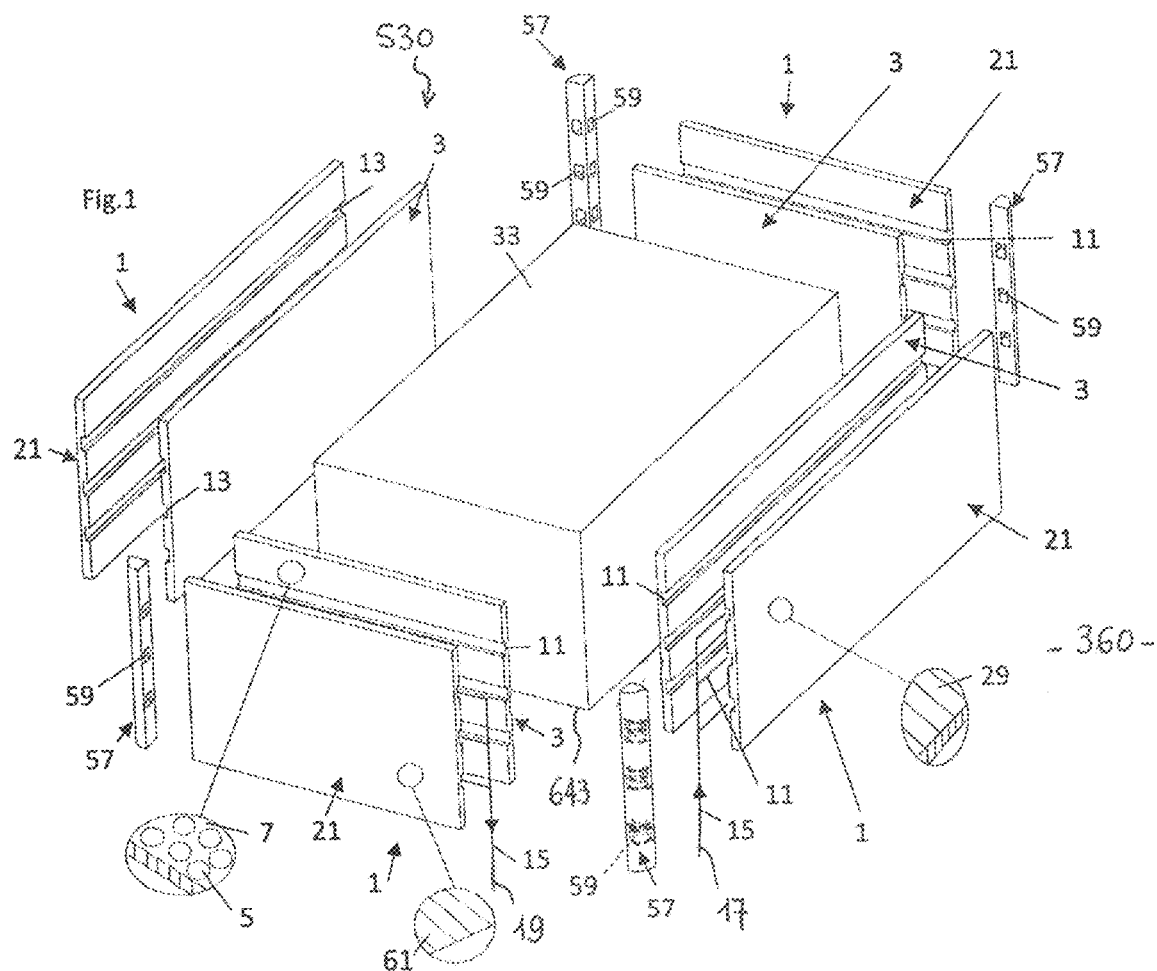
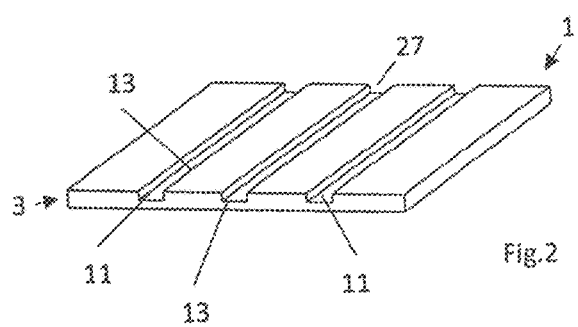
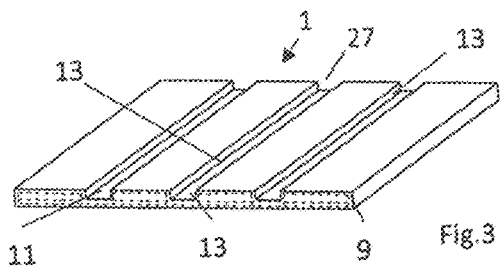

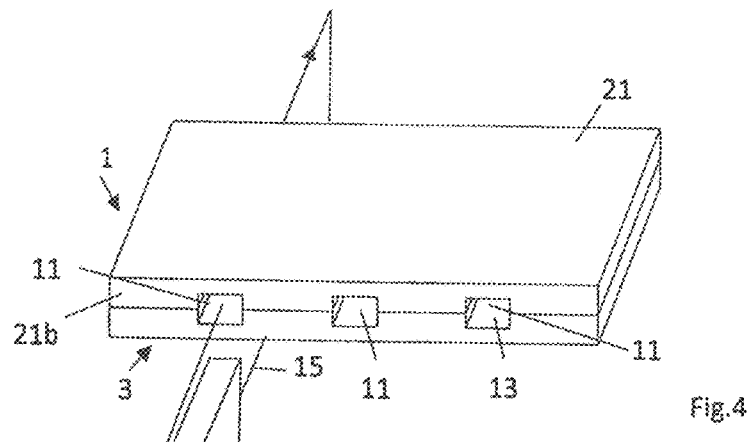
Fig.4
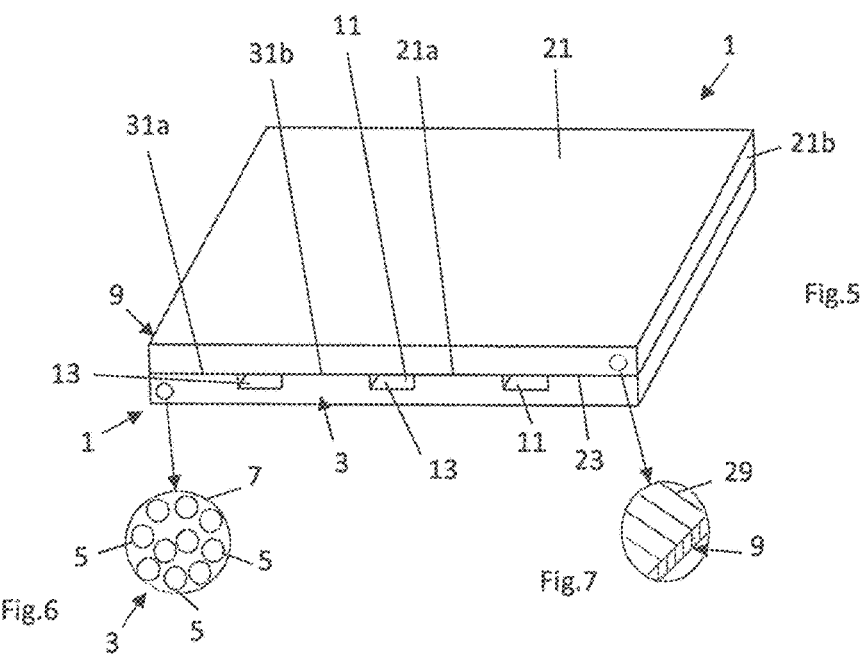
Fig.5
Fig.6
Fig.7
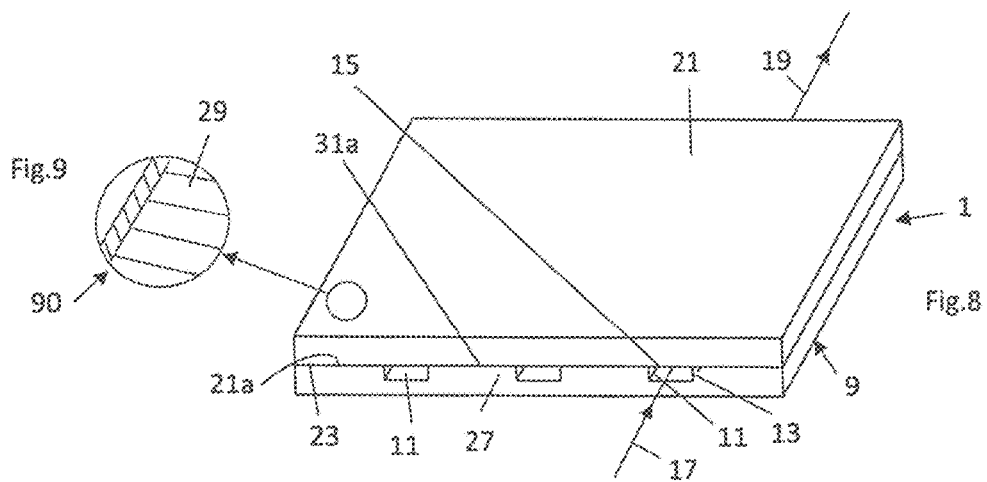
Fig.8
Fig.9

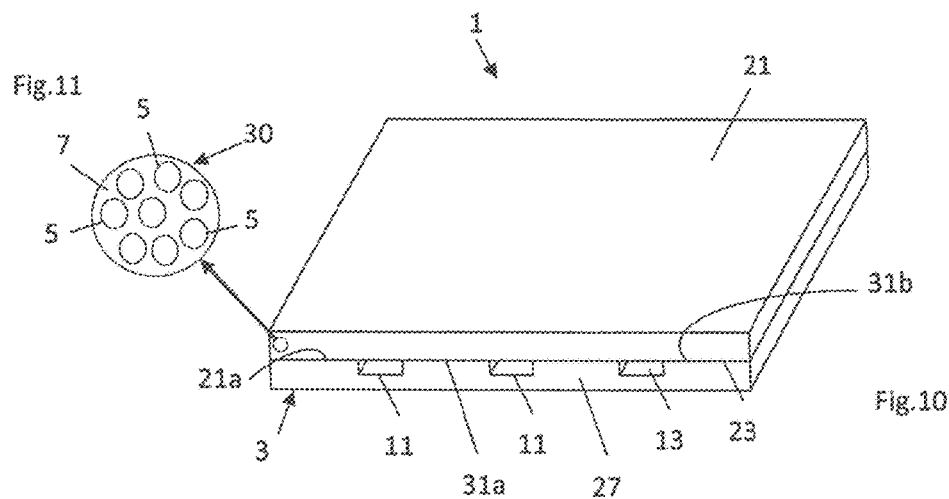
Fig.11
Fig.10
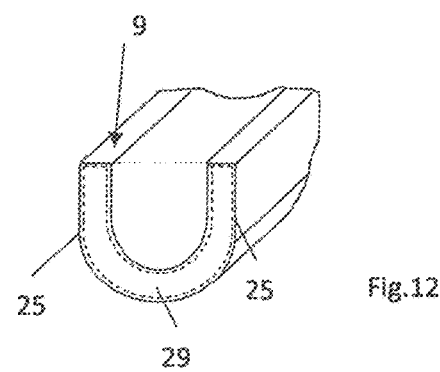
Fig.12
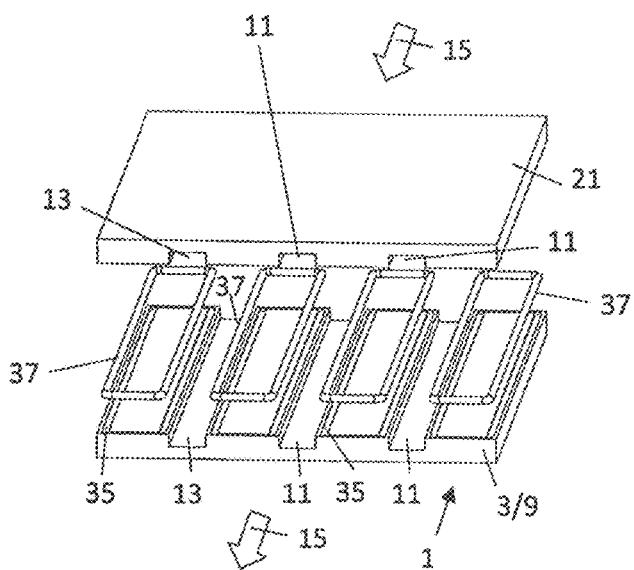
Fig.13

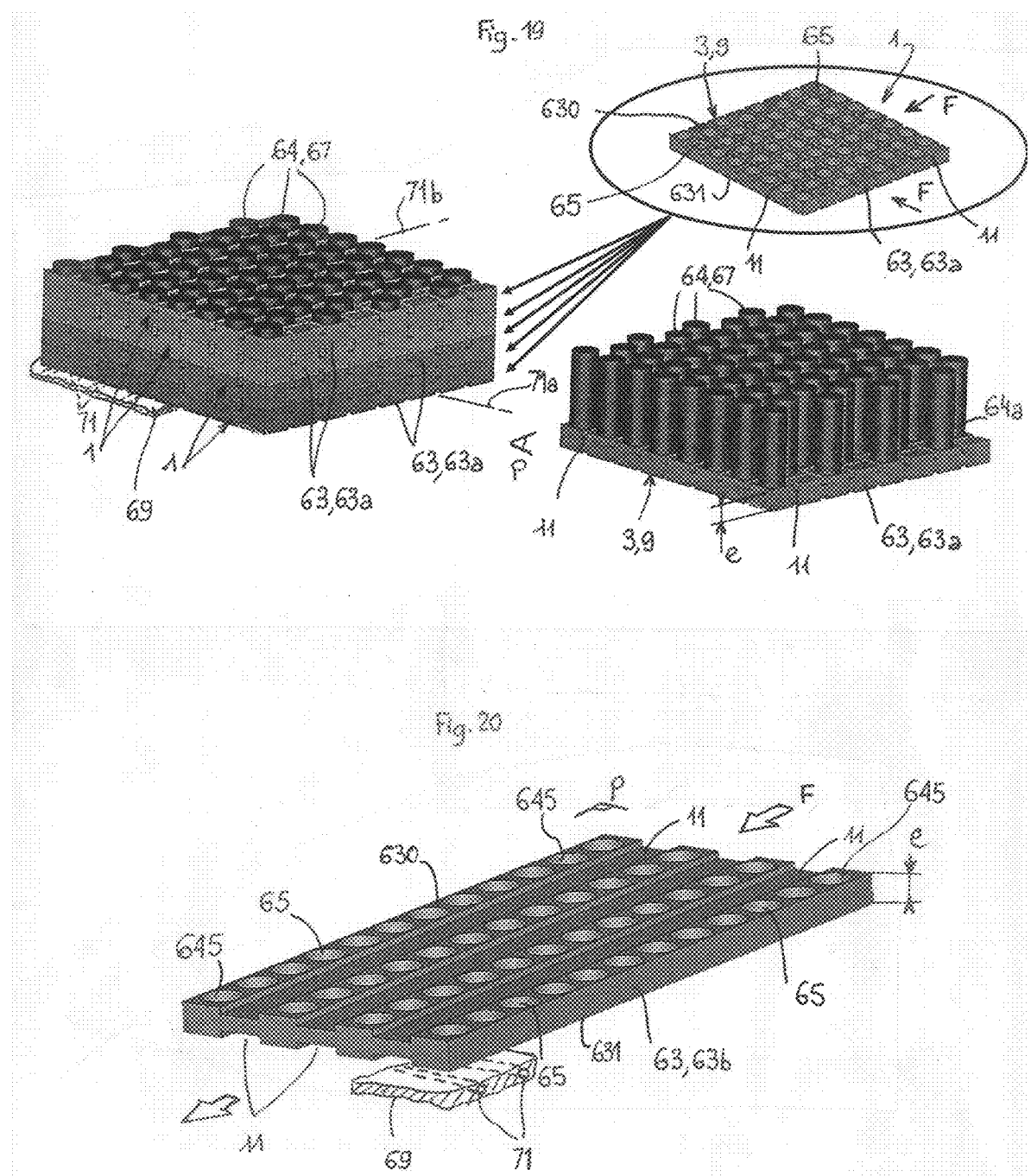

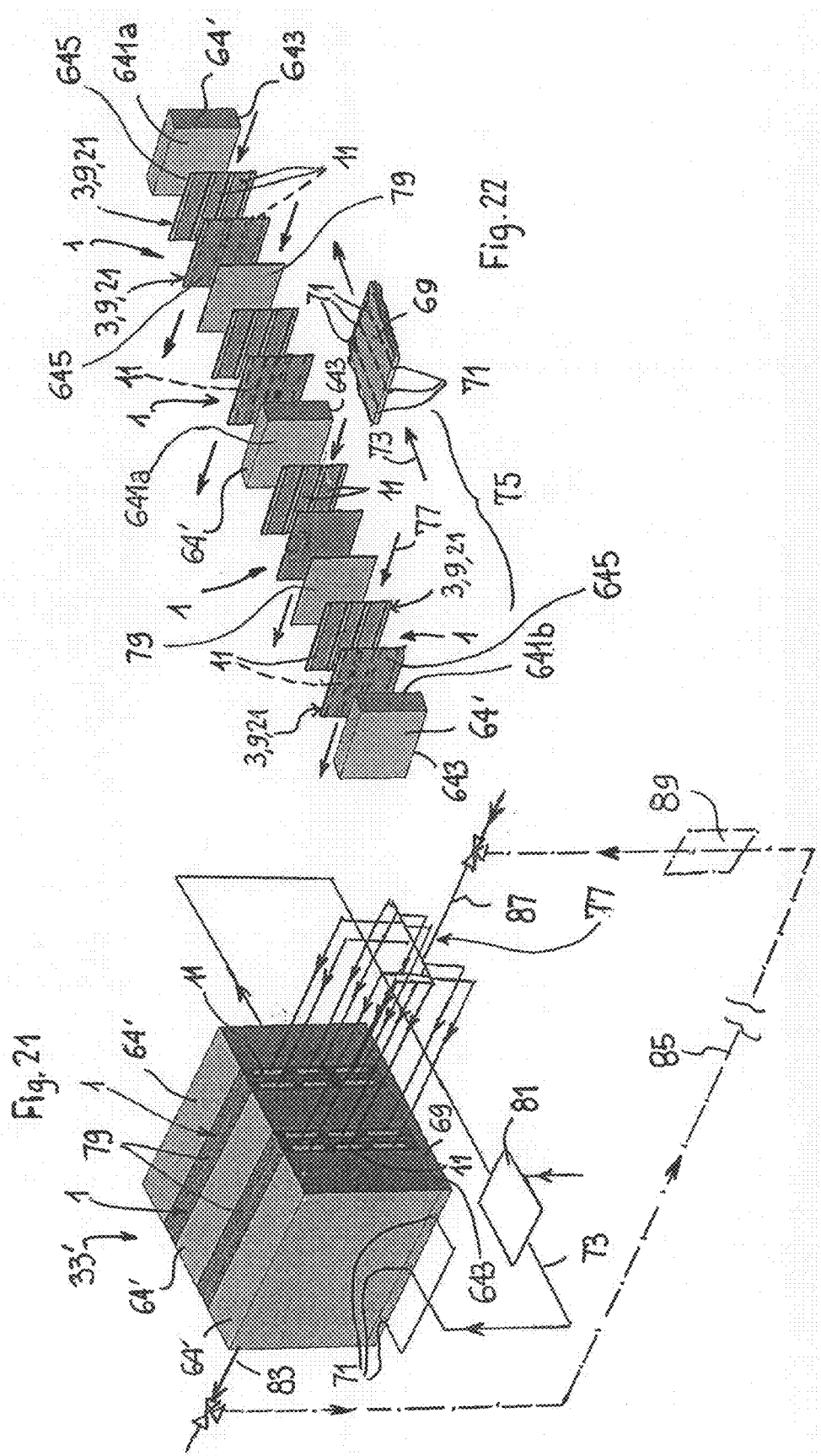

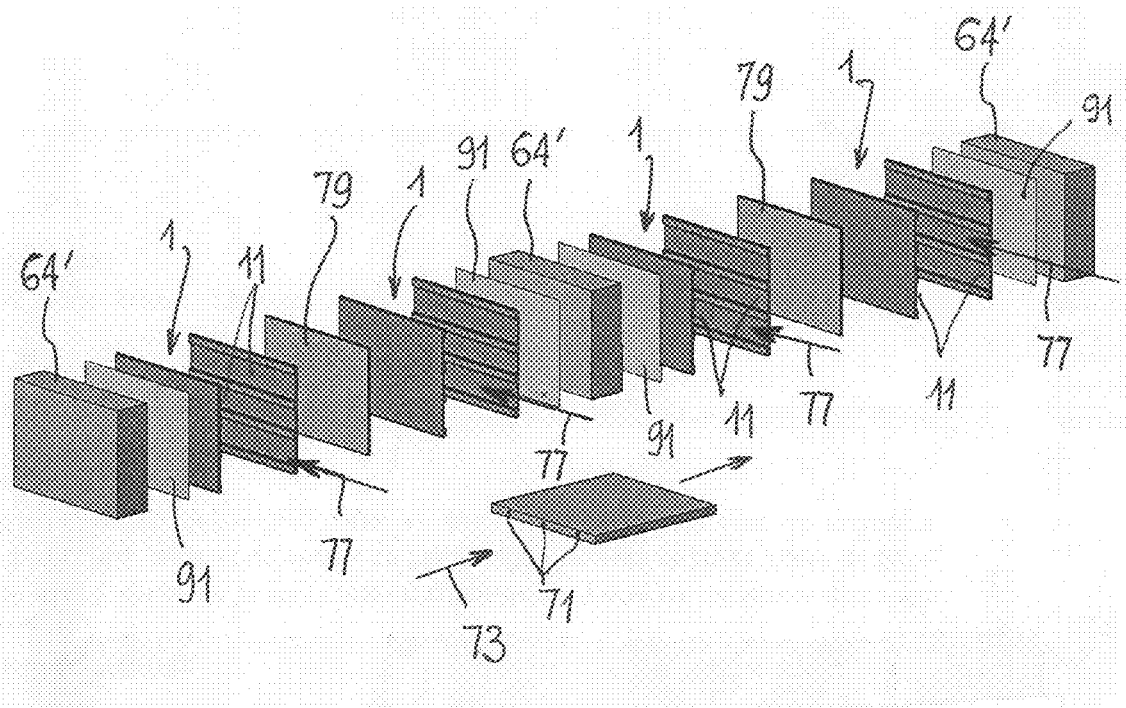
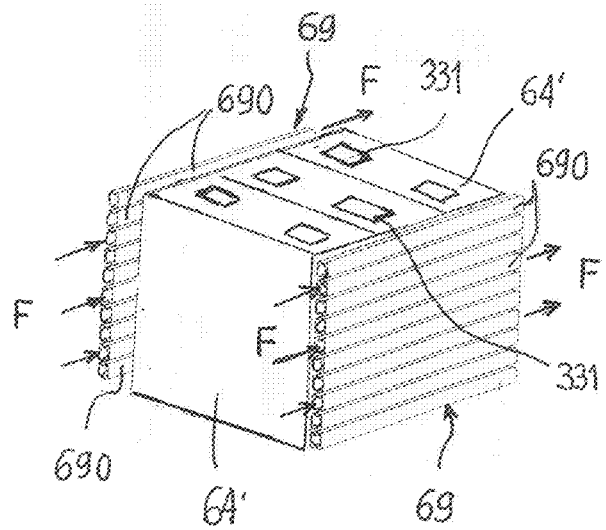
Fig. 23
Fig. 24

THERMAL MANAGEMENT STRUCTURE WITH FLUID CHANNELS

CROSS-REFERENCE TO RELATED APPLICATIONS

This application is a 35 U.S.C. § 371 filing of International Application No. PCT/FR2019/052012 filed Sep. 2, 2019, which claims the benefit of priority to French Patent Application No. 1857878 filed Aug. 31, 2018, each of which is incorporated herein by reference in its entirety.

The present invention concerns the field of thermal management.

In particular, it concerns a thermal management device (also called a thermal barrier) designed to promote temperature management in an internal volume which this barrier surrounds or borders, on at least one side, and/or with respect to a temporary heat-producing element disposed therein.

This applies in particular, especially on a vehicle, to pipes, ducts or hoses in which fluids, such as air or oil or a refrigerant (such as R1234 yf), circulate, or to electrical installations that thermal, such as electric storage batteries, or to engine parts whose temperature is to be managed:

situations where a rapid rise in temperature must be encouraged, such as during a cold start,
situations where it is necessary to promote cooling of the said engine part, such as in subsequent stabilized operation.

In the present text the following meaning will be applied:

PCM: a phase change material that changes its physical state (typically between liquid and solid) within a restricted temperature range, and absorbs up to a certain threshold a temperature change by storing the received energy; typically a temperature increase transmitted by a temperature rise of at least one cell, thermal insulator (insulation): a material with a thermal conductivity≤0.5 W/mK, which conducts heat less well than a PCM when it is in a phase in which it is the least thermally conductivity, and thermally conductivity: a material of thermal conductivity≥1 W/mK.

As PCM, one can find:

«hot» PCM(s) having a melting temperature between more than 22° C. and 38° C., and preferably between more than 25° C. and 37° C. This type of PCM can be used during summer rolling and in particular when the outside temperatures are above 40° C. By melting, the PCM stores the calories coming from outside and creates a first thermal barrier;

«cold» PCM(s) having a melting temperature between 14° C. and less than 26° C., and preferably between 15° C. and less than 25° C. This type of PCM can be used during winter driving, especially when temperatures are negative. By crystallizing, PCMs release calories that thermal up the battery pack; even PCM(s) used, in direct thermal contact with the cells, typically an PCM with a precise melting temperature, typically 35° C., as one can try to create a step on a range of temperature considered currently high of the cells, in order to avoid thermal propagation between cells (buffer effect).

In a battery, it can be very useful to be able to regulate the operating temperature of the cells that thermal up when they produce current and that favorably must remain within a precise temperature range whatever the external temperature conditions are, even when the cells are at standstill.

In an air pipe connecting two hot zones of an internal combustion engine, for example, the temperature in the internal volume of the pipe may have to be regulated.

In an engine crankcase, after a cold start phase, evacuating or rather transferring calories can be useful.

In this context, it is therefore conceivable that it may be necessary, depending on the situation:

to isolate from the outside environment, or to manage the temperature evolution, of an interior volume and/or its contents, and/or to delay or on the contrary to favour the propagation of a thermal flow out of or towards this volume.

To circulate a fluid in a structure adapted to participate in this thermal management may then also be necessary.

There are such structures which have fluid circulation passages between two layers of material, between an inlet and an outlet for the fluid, so that, with respect to the fluid, thermal insulation—if the layers are thermally insulating—or thermal exchange—for example if the layers contain a PCM—is obtained.

In this case, a material, i.e. an element, having a solid phase at temperatures≤20° C. should be preferred.

Thus, FR3015780 discloses the use of fluidic channels arranged in PCM and allowing the circulation of a thermal transfer fluid, especially a liquid one. The fluidic channels are formed in a rigid block allowing them to be held in place when the PCM, phase change material, changes to a liquid state.

This is a rather complex assembly to fabricate. In addition, there is no indication of how the shape of the PCM layers and the "rigid block" to hold the fluid channels in place can be achieved.

Thus, among the problems that we wanted to solve here is the one related to the efficient realization of the structures, or assemblies, adapted to participate in a thermal management of the environment.

On this subject, FR3063137 discloses an assembly including:

a battery for a vehicle,
a casing surrounding the battery cells, and
for the thermal management of the battery (thermal exchanger 4), structures (two assembled plates 41,42) individually comprising at least one phase change material (PCM) surrounding at least one conduit suitable for the circulation of a fluid, said conduits being connected to a fluid inlet and fluid outlet.

In thermal contact with the battery, below it, a composite body thermal exchanger is, in FR3063137, arranged, together with the battery, in a housing whose characteristics are not specified. Only local thermal management (under the battery) is taken into account. No larger scale application is envisaged, which would imply the joint use of several so-called composite body thermal management elements having integrated depressions and thus a specific industrial implementation.

It is because of this thought that the present invention has thrived.

The present invention deals indeed with:

a more global thermal management of the battery cells,
the industrial implementation of such a proposed generic solution, A solution proposed here thus consists in one said assembly as above, but which is further characterized in that:

said structures define or line (viz. double) the side walls of the case, on the first sides of the cells, and the assembly also includes:
- a cooling plate through which a (first) thermal exchange fluid adapted to thermal exchange with the cells can circulate, the cooling plate being arranged, for a thermal exchange with the cells, on (thus facing) second sides of the cells different from said first sides, and/or
- one or more thermal exchange element(s) through which can circulate a (second) thermal exchange fluid adapted to thermally exchange with the cells, the thermal exchange element(s) being interposed between said first sides of the cells and said structures.

The term "cooling plate" is to be understood as defining a thermal exchange means through which said (first) thermal exchange fluid is able to exchange thermal with the cells located in contact with this cooling plate.

Structurally, such a "cooling plate" can be presented in
- particular in the form of (at least) a flexible pocket, a rigid panel, a series of parallel (as in FIG. 24) or crossed tubes, each (pocket(s), panel or tubes) containing a volume adapted to the circulation of said (first) thermal exchange fluid. Thus, the terms "cooling plate" and "thermal exchange elements" are synonymous.

The expressions "first sides" and "second sides" of the cells are to be considered as follows: the cells are identically oriented, parallel to each other, arranged in a line. In each case, therefore, one side is common to an entire group of stacked cells (even if the stack is flat); see FIGS. 1,18,21-25.

The case of prismatic cells will be a general case; it is the case of the examples below (except for the solution of FIGS. 19-20).

The first and second thermal exchange fluids may be the same or different; the same applies to the fluid flowing through the conduit(s) of the said PCM structures. One can thus imagine one and the same fluid circulating in series or in parallel in the above-mentioned elements.

In any case, the invention proposes to address the above-mentioned question of the thermal management of the battery cells rather than in the form of a plate placed under the battery, all in a "neutral" housing. Indeed, it is also with the external environment that it was decided to compose. Thus, it was decided to functionalize the case, and not the inside of it as in FR3063137, and to combine this with thermal exchanges without PCM via the (second) thermal exchange fluid. This will allow dissociation between functions:
- that delay or promote the propagation of a thermal flow out of the housing or into it via the PCM,
- from those that first ensure thermal exchange with the cells, without thermal smoothing via PCM.

The reluctance to apply to the housing (which defines the external footprint of the "battery zone") an approach typically considered to be confined to the inside of the housing will have been overcome.

In addition, the way of thermally managing the battery, on one or more sides of a complete cell array, and creating a thermal barrier (with PCM and thermal insulation) around it is a departure from the conventional way known, while providing a significant advantage in terms of performance/weight/size.

In addition, the invention proposes to create the conduits crossing the PCM to circulate fluid therein:
- either via plates, tubes or equivalent, attached to the conduits,
- or by integrated depressions.

Thus, it is proposed that the phase-change material (PCM) be present in a rigid structuring matrix, so that a self-supporting composite body is then formed regardless of the phase of the contained phase-change material, the composite body being shaped to locally present externally at least one depression that defines by itself a channel wall corresponding to the at least one conduit suitable for fluid flow.

Compared to the teaching of FR3063137, the advantage of obtaining rather fine and light elements will then have been amplified by applying it to a thermal barrier.

On this subject, in order to widen the conditions of use of the fluid concerned, it is also proposed that functional blocks be provided, each interposed between two successive structures, which will bring them together and which will be crossed, for the circulation of the fluid, by communication passages between the said conduits of the successive structures.

If the said blocks are corner blocks placed at the corners of the case, the fluid flow may usefully take place on several adjacent faces, or even on the entire circumference (a priori therefore on four faces) of the battery (i.e. the cells considered all together).

A modular approach for the industrial implementation of the solution has also been considered to make sense.

For the same purpose, it is also proposed that the structures should individually include a cover comprising:
- at least one additional (or second) composite body, self-supporting regardless of the phase of the phase change material contained, and/or
- a plastic or metal bag, gas-tight and under partial internal vacuum, the shape of which is maintained by the said internal vacuum, the cover being fixed with the (first) composite body in a fluid-tight manner.

It is also proposed that this cover should be shaped to present locally at least one elongated depression:
- which will in itself define an additional channel wall suitable for fluid flow, and
- which will complete and laterally close said channel wall of the initially mentioned (first) composite body at a contact interface.

Since the question of the (first) composite body/cover connection may be critical, it is proposed that each composite body or pocket has lateral flanges for support of the cover, which can then be welded to the (first) composite body at the location of said flanges.

In this way, welding on the edges of the parts will be avoided a priori, thus facilitating and securing the composite body/cover connections.

Concerning welding:
- for composite body/cover connections, brazing can be used, provided that each connection created is sealed against the fluid to be circulated,
- however, it is preferable that, for the production of a pocket in itself, the sheets, films or plates to be joined together for this purpose should be welded together by welding excluding a priori all brazing, in accordance with the recognised meaning of the technique. In this welding, there will then be no filler material and/or no fusion of the assembled edges. In the following text, the vacuum seals of the pockets will a priori be such continuous welds and not of the spot welding type.

In the above, it will have been noted that, in one case, the "channel wall" defined by each said depressions "could be suitable" for the circulation of a fluid. Thus, this is only one possibility. One may indeed prefer to interpose a sheath for the circulation of the said fluid which:

will present an inlet and an outlet for the fluid, respectively connected to the fluid inlet and outlet of the channels, will integrate several elongated recesses wedged in several said depressions at least one depression, will be fixed between the cover and the (first) composite body, and which:

transversely to a general direction of elongation of depressions:

will occupy a closed section between 30% and 100% of the cumulative (total) section of said:
cover, and
composite body, and, with said recesses occupying a minor section, preferably between 5% and 20% of the total section of the sheath.

Even if respectively the intrinsic strength of the composite body and the internal partial vacuum contribute to the shape of the above-mentioned structure, the specific shape chosen should be of importance in achieving both a certain intrinsic stiffness and the definition of the fluid channels.

It is to this end that it is proposed that each self-supporting composite body or so-called pocket should have:
a curved shape having angles; and/or,
a crenellated shape with at least some of the crenellations defining said depressions.

In the present solution, compared to FR3015780, there are no fluid channels arranged in PCM: the channels are separated from the PCM by the material of the composite body or even the cover. In fact, there is no longer any need for added structural elements to define the fluid channels in themselves, within a rigid intermediate structural element also added (which can also be dispensed with), nor is there any risk of altering the mechanical strength of the structure, which is self-supporting, if only because of the said depressions.

It should be noted that the above applies in the same way if, in the pockets, a thermal insulating material is placed, which may even reinforce the intrinsic strength of the vacuum pockets.

To all intents and purposes, it is at this stage:

confirmed that a phase-change material (also called PCM) refers here to any material capable of changing its physical state, for example between solid and liquid or solid and gaseous, in a restricted temperature range between −50° C. and 50° C., or even between −60° C. and 150° C., taking into account the privileged applications which may occur in the field of vehicles or machines (land, air, sea or river). Heat transfer (or thermal transfer) can occur by using its Latent Heat (LH): the material can store or transfer energy by a simple change of state, while maintaining a substantially constant temperature, that of the change of state, and specified that the thermal insulating material(s) may be a "simple" insulation such as glass wool, but a foam, such as polyurethane, is certainly preferred, or even more favourably a porous thermal insulating material.

In connection with the use of a rigid structuring matrix, it was sought to define solutions that satisfy the following problem: industrial mass production, reduced mass, easy and precise cutting for shaping at will, low cost, thermal performance (adapted thermal conductivity, especially in a "battery" environment), maintenance of the phase change material (PCM) in the matrix during the phase change of the material, possible use in a fluid(s) exchanger system, with capacity for the PCM to be not in contact with the fluid(s), in order to avoid dispersions when it is in liquid phase (or gaseous in the event that it is in one of its phases). The contact (interface) with the fluid(s) will then be ensured by the rigid structuring matrix, Taking this problem into account, it is first proposed that the composite structure should include an elastomer or fibers, thus in addition to at least one PCM (and a priori preferably to a material with several PCMs changing phases at different temperatures). With an elastomer, one will benefit from a high deformation capacity, while the fibers will be used for their lower density and their important capacity of impregnation of PCMs.

In the composite structure option including (at least) one elastomer, it is proposed that the elastomer be selected from the following compounds: NR, IR, NBR, XNBR, HNBR, ECO, EPDM, EPM, CM, CSM, ACSM, CR, ACM, EVA, EAM, ethylene-acrylic acid copolymers, butyl rubber, halogenated butyl rubber and isobutylene-p-methylstyrene para-bromo-methylstyrene, with the addition of at least one of the following modifying agents: carboxylic acid maleic anhydride-grafted 1,2-vinyl polybutadienes or epoxidized and/or hydroxylated polybutadienes, silanes, ethylene-acrylic acid copolymers, maleic anhydride-grafted ethylene-propylene copolymers.

In this case, it will be a priori preferred that:
the compactness should be between 60 and 100%.
the conductivity of the composite body be between 0.5 and 3 W/m·K−1, preferably between 1 and 2 W/m·K−1, and
the mass concentration in the composite body of the phase change material is between 40% and 70%, preferably between 50% and 60%.

In the option composite structure including fibers, it is proposed that (at least) a graphite felt be used to take into account the above-mentioned problem.

Reverting to the question of the global thermal management of the battery with a functionalized box, it is also proposed:

to place said composite body structures (PCM) in thermal exchange with the cells, on the first sides of said cells, and to move the cooling plate of FR3063137 (thermal exchanger 4) also arranged in thermal exchange with the cells along second sides of these cells, the cooling plate thus having conduits, which are connected to a second supply of a fluid to be circulated therein.

Note:

that the said first sides may usefully comprise (at least) two opposite first sides of a group (or assembly) of cells aligned side by side, and parallel to which (sides) will extend respectively a first and a second so-called structure, each in the general shape of a plate, and that the cooling plate will then form a third said structure parallel to which said second sides of the cell group will extend, these second sides being different from said (at least) two opposite first sides of this cell group.

Thus, it is on at least three different sides that the cell group in question will be in thermal exchange with PCM, or even with the fluid to be circulated through it.

It should be noted that the housing can also usefully define a thermal barrier:

which will border on several sides an internal volume in which the cells of the battery will be placed, and whose said structures, which will define or line its side walls, will delay or promote the propagation of a thermal flow out of or towards the volume.

In fact, the approach followed for the functionalization of the housing which is at the interface between the (internal) cells and the external environment allows the aforementioned assembly to form not, or not only, a thermal exchanger, as in FR3063137, but a thermal barrier, around one or several groups of cells, thus between this (these) group(s) and the external environment in which the vehicle equipped with the solution of the invention will evolve.

For this purpose, it will be useful to provide thermal insulating walls to line the outside of the said structures.

In particular, the thermal insulating walls will line the structures by being attached to them externally, or by the structures them externally.

Thus, the PCM (or preferably the different combined compositions of phase changing PCMs at different temperatures) will be present in particular to smooth out an excess of heat or cold coming from the outside environment, after said thermal insulating wall(s) have been traversed by the thermal flow directed from the outside (the environment) to the inside (said volume where the cells are arranged).

The invention will if necessary be better understood and other details, characteristics and advantages of the invention may appear when reading the following description made as a non-limitative example with reference to the appended drawings.

In these drawings:

FIG. 1 schematizes (in exploded view) structures conforming to those of the invention between and around a battery cell, to ensure a peripheral thermal management;

FIGS. 2-5, 8, 10 and 12 show various examples of such structures conforming to those of the invention;

FIGS. 6,7 schematize two local enlargements of the realization of FIG. 5; and

FIGS. 9 and 11 schematize two local enlargements of the realizations of FIGS. 8 and 10, respectively, it being noted that FIGS. 4 to 11 show operational structures, with joined elements, while FIGS. 1 and 13 to 17 are exploded views;

FIG. 12 shows a composite body or so-called pocket, of curved shape; here with a roughly U- or C-shaped cross-section;

FIGS. 13,14 show two solutions respectively with joints and additional tubes with liquid circulation, these two aspects can be dissociated;

Figure 15:
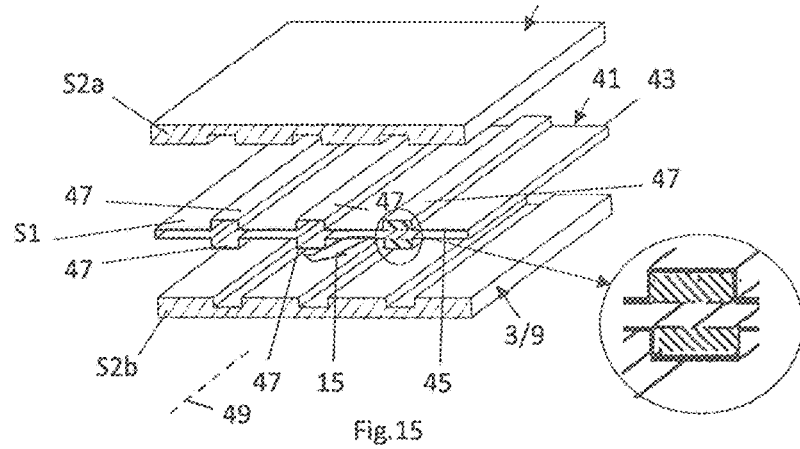
Figure 16:
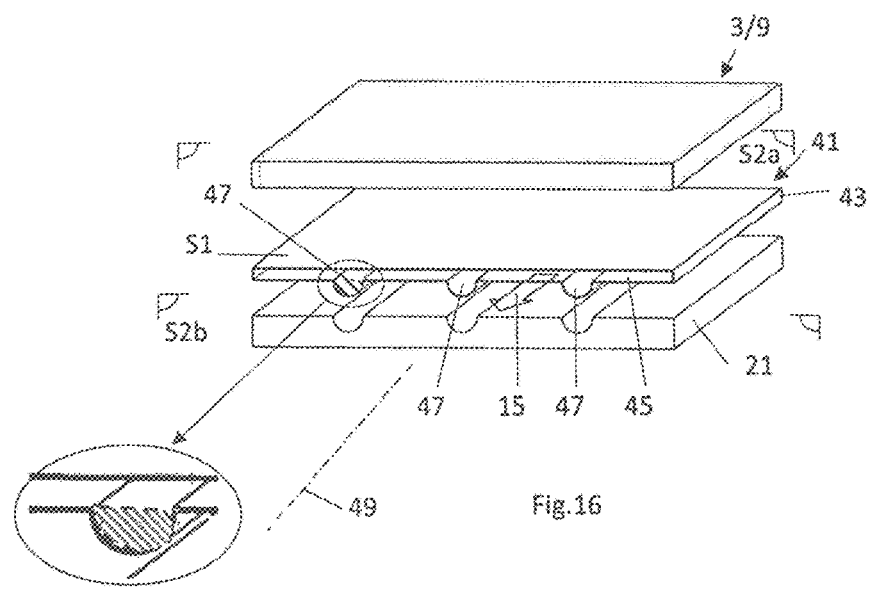
Figure 17:
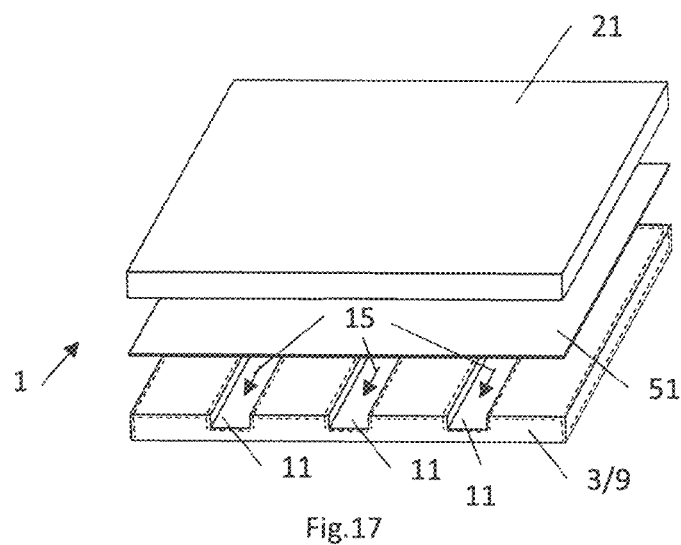
Figure 18:
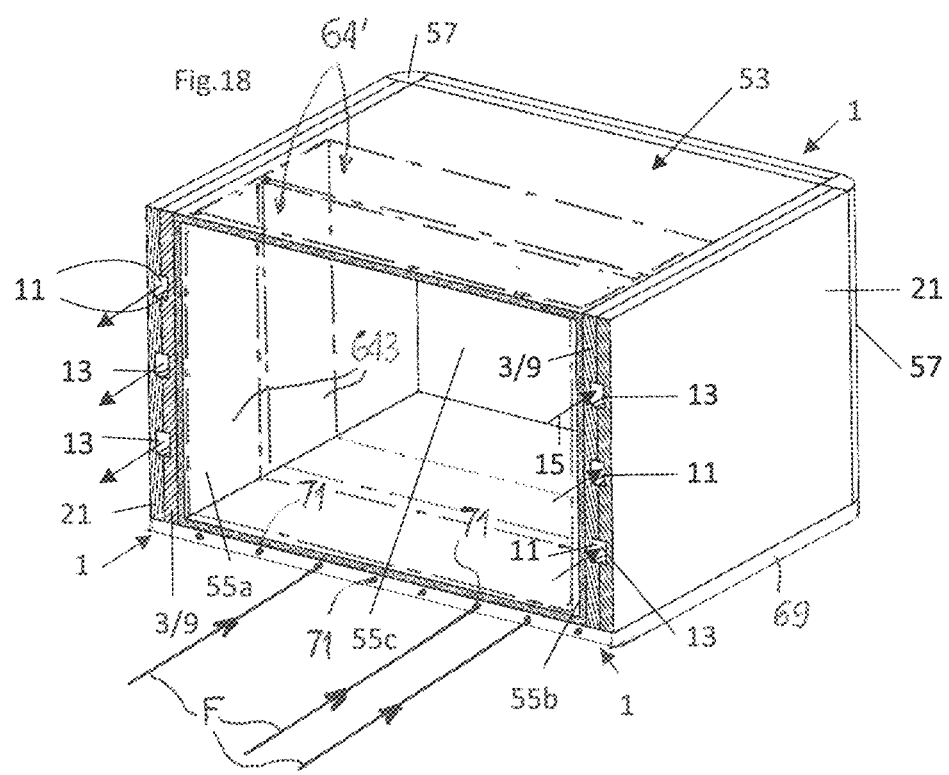

FIGS. 15,16 schematize two solutions with intermediate fluid circulation sheath;

FIG. 17 shows a solution having an intermediate plate for lateral closure of fluid circulation channels;

FIG. 18 shows a case with two side panels incorporating fluid flow channels,

FIGS. 19 (in three parts: top, right and left) and 20 schematize a solution having stacked trays, passages for cells and air channels, FIGS. 21,22 show a combined and exploded thermal management assembly of prismatic battery cells with dual fluid flow, surface and core respectively, FIG. 23 schematizes the solution shown in FIG. 22, with additional electrical insulating sheets, FIG. 24 schematizes two "cooling plates" 69 in the form of tubes, or pipes, 690 parallel to each other and through which a fluid F circulates, FIG. 25 schematizes a part of a housing for electric battery cells (or accumulators) that can be made as in FIG. 1 but with thermal exchange elements (340 below) interposed laterally between the cells and the battery thermal management structures (1 below) and spacer blocks (570 below), and FIGS. 26,27 schematize two variants of realization of fluid conduits in a thermal management medium containing PCM.

DETAILED DESCRIPTION

A goal of the solution proposed here is thus the efficient realization of structures with thermal inertia (related to the presence of PCM) and/or thermal insulation (related to the presence of PIV type thermal insulation) implemented for environmental thermal management purposes, in particular a battery of accumulators.

In fact, structure 1 proposed for this purpose includes, as illustrated:
- a composite body 3 containing at least one phase change material 5 (PCM) dispersed in a rigid structuring matrix 7, so that the composite body is self-supporting regardless of the phase of the phase change material contained, and/or
- a plastic or metallic, thermally conductivity, gas-tight and under partial internal vacuum (PIV type) pouch 9, having a shape maintained by the internal vacuum. Each pouch 9 (or 90 below) can wrap (i.e. contain) PCM 5.

The composite body 3 and/or the pocket 9 are shaped to present locally at least one so-called depression (or hollow) 11 which defines by itself a channel wall 13 which may be suitable, or even intended, for the circulation of a fluid 15, it being then assumed that the channel created is then connected to a supply 17 and a recovery 19 of this fluid, which may be liquid or gaseous, see:

FIG. 4 for an example of circulation of fluid 15 in a closed circuit, with passage through an exchanger 20 where fluid 15 could either be charged with/either discharge calories or frigories, and FIG. 8, for an example of fluid flow 15 in an open circuit.

Fluid 15 can be either a thermal transfer medium or a refrigerant. It can be a liquid.

If, as shown in FIG. 2-3, structure 1 with the above-mentioned characteristics is limited to a composite body 3 or a pocket 9, the wall 13 of the channel (depression 11) can be closed off laterally, and thus the structure completed by at least one cover 21:
- which will locally complete (itself) the wall 13, via a part of its surface 21a placed against the composite body 3 or pocket 9, and
- which will be attached to this composite body or pocket in a fluid-tight manner.

In the figures, the elements marked as composite body 3 or pocket 9 or cover 21 can be interchanged.

Thus, in an assembly or a structure 1 provided with a cover 21, at least one of such elements may be presented as a plate, without a so-called depression, as shown in FIGS. 5, 8, 10.

For the connection with this cover, it is proposed that each composite body 3 or pocket 9 has lateral flanges 23 for a support of cover 21. Cover 21 can then be welded to the composite body or pocket at the location of the flanges 23. In this way, welding on the edges of the parts can be avoided, as shown in FIG. 4.5.

From the above, it is clear that any shape that serves as a cover for the fluid channel 15 is suitable.

However, for the design of the covers, it may be preferable, as shown in FIGS. 9,11, that each cover 21 should include at least one cover:
- an additional self-supporting composite body 30 regardless of the phase of the PCM contained, and/or an additional pocket 90, PIV, plastic or metal, therefore gas-tight and under partial internal vacuum, whose shape will be maintained by the internal vacuum.

As previously, this additional composite body 30 and/or additional pocket 90 will then be shaped to locally complete and laterally close the wall 13 of the above-mentioned canal, i.e. each depression 11.

As already mentioned, this will be an interesting answer to the current difficulties to industrially produce in large series a structure allowing at the same time a fluid circulation and a packaging of either a vacuum or PCM.

In order to help achieve both a certain intrinsic rigidity and the definition of the desired fluid channels, it is also proposed that each composite body 3,30 or so-called pocket 9,90 present, as illustrated:
- a curved shape, with angles 25 which may be rounded (see FIG. 12), and/or,
- a crenellated shape in which at least some of the crenellations 27 define several so-called depressions 11 (see FIGS. 3,10 for example).

These slots and corners will also be well exploited by providing that, in order to laterally close each channel (i.e. each depression 11), the cover 21 and the self-supporting composite body 3 or pocket 9:
- have watertight welds between them, at the location of respective sections, such as 31a, 31b, of walls bordering the channels,
- and are in support two by two, including at the place of the said respective sections of walls, such as 31a, 31b, thus interposed between two consecutive channels, or located on either side of the laterally external channels.

In pockets 9 or 90, a so-called thermal insulating material (see above) may usefully be placed 29, which may even reinforce the intrinsic strength of the vacuum pockets.

Concerning the choice in the realization of composite bodies 3,30, the following recommendations may be followed, in particular to meet the need to maintain the temperature of cells or housings of a battery for electric or hybrid vehicles; cf. FIG. 1 where each structure 1 comprises in the example two parts 3,21 each integrating directly a series of channels (depression 11 having walls 13), here parallel, of fluid circulation 15, which arrives and leaves via an external circuit.

Indeed, lithium-ion cells in particular are strongly impacted by the temperature parameter. If this parameter is not taken into account, it can have serious consequences on the lifetime of the battery cells, on their performance (capacity and delivered power), on their stability and on the safety of use.

First of all, even if the liquid-gas and inverse change of state of PCMs is interesting in terms of the amount of energy involved, the preferred change of state in the targeted applications may be solid-liquid and inverse.

Then, to stay with the example of lithium-ion cells, the temperature range in which they must be maintained to operate optimally is between 25° C. and 35° C.

In addition, to stay with the example of lithium-ion cells, the temperature range in which they must be maintained to operate optimally is between 25 and 35° C.

However, in addition to the materials used for the elements participating in the thermal management and the layering of these elements in layers that can combine PCM and thermal insulation (see for example WO2017153691), it may be necessary to provide for a fluid circulation within this architecture, typically between two layers of materials; see channel 55 in this document.

To be able to circulate a fluid 15, with channels connected for example to an external air circuit, between the inlet/supply 17 and the outlet/recovery 19, will then be required, in a structure such as that 1 presented here.

In addition to achieving this with the above solution, we also wished to define a high-performance composite body, as mentioned above, since it is the very nature of this body that will ensure the criteria of thermal performance, self-supporting and ease of shaping or cutting expected.

Therefore, two solutions are proposed, respectively based on elastomer or fibers, each with several PCMs changing phases at different temperatures.

It should be noted that the phase change materials used in the formulation will then be favorably formulated in order to include them in matrices with a mass quantity of PCM in the formulation typically between 30% and 95%.

Formulations will preferably use microencapsulated or pure materials whose phase transitions can be included, for battery applications, between −10° C. and 110° C. (depending in particular on the electrochemistry, lithium-ion or not).

In the case of lithium-ion applications, microencapsulated PCMs with a mass percentage on formulated product of 35% to 45% can be used. These PCMs should be favourably embedded in a silicone matrix containing, in particular, flame-retardant and thermally conductive fillers.

In the first of the two above-mentioned solutions, matrix 7 includes (at least) an elastomer, which allows the body 3 to be adapted to situations that may require mechanical stressing or the monitoring of complex shapes (elastic aspect of the elastomer), with small masses.

In the second solution, the matrix 7 comprises fibers.

To take into account the above-mentioned problem, it is proposed to use (at least) a graphite felt, with graphite fibers.

In terms of implementation, several structures 1 could be installed between two adjacent cells and/or on different faces and periphery of the battery compartment to wrap it.

Starting from the surface of the battery compartment, four layers of phase-change material (several PCMs) can be provided, between which fluid 15 (e.g. air) may be circulated. On the outside of the PCM elements, the vacuum insulation is installed, typically one or more pockets 9 or 90. A thermally conductive peripheral envelope will allow the mechanical strength and protection of the system as a whole.

It should be noted that the above two solutions ensure that the PCM is not in direct contact with the fluid and that there is no leakage of PCM in the fluid state.

In general, a composite body solution such as the one described above will work dynamically: on an electric or hybrid vehicle, typically at a time of high demand, such as for example during a start under electric drive in winter (outside temperature of 3° C./4° C. for example) we will indeed be able to circulate air (coming from the outside) through the depressions which will allow this air to heat the PCM, said air having in passing recovered thermal energy on the cells of the battery. Air may then be redirected towards the outside environment. During its journey, the air will have both warmed the PCM(s) and evacuated excess heat from the battery cells. Another hypothesis: in winter, during cell operation, air cooled by an air conditioning circuit is projected towards the cells. This blown air then passes through channels 11.

Concerning the manufacturing of the composite bodies 3,30, it should be noted that they can be presented as plates comprising compressed fibrous graphite as a structuring matrix in which the PCM, which can be, or comprise, paraffin, is impregnated.

Graphite felts can be obtained by exfoliation. If there is an envelope, it will be thermally conductive (e.g. plastic foil). The impregnated matrix will not release PCM if it is not stressed. And to obtain a composite body with an integrated channel wall, the raw composite body can simply be molded or machined. The vacuum bag solution can be obtained by folding.

FIG. 13, one solution proposes that structure 1—which comprises a composite body 3 and a cover 21 having at least one other so-called composite body 30—additionally includes grooves 35 in composite body 3 and/or cover 21. The grooves 35 receive seals 37 for fluid tightness between said bodies, bordering the depressions 11. In the example, the fluid 15 is in direct contact with the channel walls 13.

Figure 14:
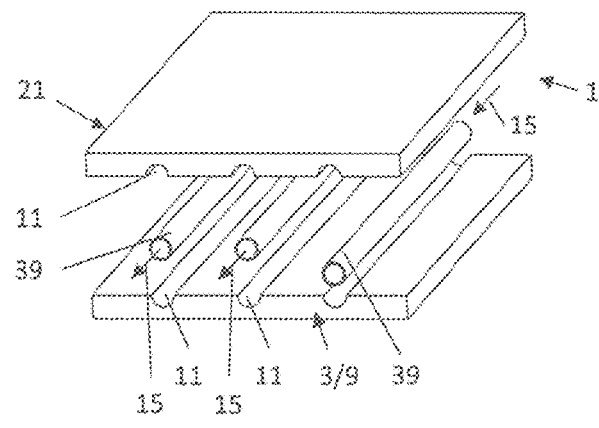

The alternative solution in FIG. 14 proposes that structure 1 should include tubes 39 for the circulation of a liquid defining said fluid 15. The tubes 39 are individually received in the opposing depressions 11. They are made of a material that promotes thermal exchange with the interior of the elements 3,9,21 so that this takes place as the fluid passes through.

The alternative solution in FIGS. 15,16 proposes that structure 1 include a sheath 41 for the circulation of the fluid 15. Sheath 41 has an inlet 43 and an outlet 45 for the fluid. It incorporates several elongated protrusions 47 protruding outwardly. These protrusions 47 are received (wedged) in the opposing depressions 11. The sleeve 41 is fixed directly or not (e.g. by gluing together panels 21 and 3 (or 9) on either side of the sleeve) between cover 21 and the composite body or said pocket. Transversally to a general direction 49 of elongation of the protrusions 47, and thus of the depressions 11:
  the sheath 41 occupies a closed section S1 (see section defined by the bold line in FIGS. 15,16) of between 30% and 100% of the cumulative section of said cover 21 and composite body or pocket (see hatched sections S2a and S2b in FIGS. 15,16), and
  in this closed section S1, the protrusions 47 occupy a minority section, preferably between 5 and 20% of the said total section S1 of the sheath (see hatching in the sheath FIG. 15). The sheath is made of a material that promotes thermal exchange with the interior of the elements 3,9,21 so that this takes place when the fluid passes through and circulates throughout the sheath (section S1).

Elongated protrusions 47 may be on both large faces of the sheath if both panels or structures 3 or 9 and 21 are provided with depressions 11 (FIG. 15), or on only one face if only one of the structures 3 or 9 and 21 is provided with depressions 11 (FIG. 16).

The advantage of a sheath compared to a solution with independent tubes or plate 51, as shown in FIG. 14 or 17, may be a security seal; it is also no longer necessary for cover 21 to be fixed together with the composite body (3) or pocket (9) in a fluid-tight manner. In the sheath solution, a grouped arrangement, self-centering and a fluid passage cross section 15 not limited to the hollow areas can be used (the entire (total) cross section S1 is concerned, not only that of the protrusions 47).

The alternative solution in FIG. 17 proposes that structure 1 should include a plate 51 for lateral closure of the depressions 11 and thus of the channel walls 13. Plate 51, which is flat and solid, is fluid-tightly interposed between the at least one cover 21 and the composite body 3 (or the said pocket 9). If both cover 21 and composite body 3 (or said pocket 9) has depressions 11, plate 51 could allow two different fluids 15 to flow on either side of the plate into the respective depressions 11. If tubes 39 for circulation of a liquid, as a fluid 15. The tubes 39 are individually received in the opposing depressions 11. They are made of a material that promotes thermal exchange with the inside of the elements 3,9,21 so that this takes place when the fluid passes through.

FIG. 18 shows a solution with a box 53 in which at least some of the side walls, three adjacent ones 55a,55b,55c in the example, are lined (doubled), here externally, by side panels 1 integrating (walls of) channels 13 for fluid circulation and blocks 57 of fluid connection angles between two channels of adjacent panels. The side arrows mark the inlets and outlets of fluid 15, respectively from and to a source, as shown in FIG. 1. In the examples in FIGS. 1 and 18, the corner blocks 57 are arranged at the corners, between two adjacent side panels, or structures, 1 arranged to form an angle between them and which the side walls 57a,57b of each corner block 57 allow to join. For the circulation of the fluid, each corner block 57 integrates conduits 59 to be connected individually to the channels 11 facing it. Each conduit 59 is curved so that the fluid flows through the corresponding corner. Preferably, each corner block 57 should be made of thermal-insulating material (e.g. PU foam).

In FIG. 18, are also schematized cells 64' contained in the housing and a cooling plate 69 arranged in thermal exchange with the cells 64' on so-called second sides 643 of the latter, i.e. on sides 643 other than those in front of which (around which) the thermal management structures 1 are located. The conduits or channels 71 always pass through the cooling plate 69, for the circulation of the fluid F concerned.

The fluids F and 15 (or F1 and F2, FIG. 25) may be different. This is also possible with the solution in FIG. 21.

In an application such as a battery 33, where thermal management may concern both part of a whole (one cell of the battery) and the whole (all the cells of the battery), element 33.53 of the above solutions presented in connection with FIGS. 1 and 18 may concern both one cell and all the cells. In the latter case, the side panels, or structures, 1 would surround all the cells, which would not prevent each cell from being surrounded by another group of side panels, or structures, 1 supplied with fluid, which may or may not be the same as the aforementioned fluid 15.

It should also be noted that cover 21 or the additional element of a panel, or structure, 1 having a body 3 or pocket 9 may comprise a thermal insulating material that is not under partial internal vacuum (PU foam, for example), and therefore not PIV (see FIG. 1).

FIGS. 19,20 also show two variants of a structure 1 which is in conformity with the invention and which comprises a series of so-called composite bodies 3 and/or pockets 9 each defining a plate 63, in two versions 63a (FIG. 19) or 63b (FIG. 20).

The objective is to create a system that allows cooling, for example by forced air, of vehicle battery cells, by promoting their thermal management in their optimal operating temperature range, avoiding dead zones and non-homogeneous temperatures.

To this end, each plate 63 has a thickness (e) and on at least one of the faces 630, channels formed by the aforementioned depressions 11. These channels extend along the entire length of the surface concerned and open individually on two opposite sides of the tray.

In addition, between the channels 11, passages 65 are formed in the thickness (e) of the plateau 63 to receive external elements 67 (in this case the cells 64) to be placed in thermal exchange with the fluid F to be circulated in the channels 11. Thus, the external elements 64,67 to be stored are stored transversely to the plane P of each plate and the flow of fluid F circulates in this plane, over the largest possible surface.

Each tray can thus be defined by a molded PCM element integrating passages 65 and channels 11, which makes assembly easy (left view, FIG. 19), integration of the fluid channels (top view, FIG. 19) and easy selection of the PCM phase change close to the operating temperature of the cells.

Typically, if the cells 64 are presented as a kind of "cylindrical stack" as illustrated, each tubular in shape, the trays will be favorably stacked, parallel, and resting on each other between channels 11 on the same side, so that one said tray 63 forms a cover for the adjacent tray 63, thus creating said channels with a closed section.

In order to increase thermal exchange, it is recommended that tray 63 include channels 11 arranged back to back, on the two opposite sides 630,631 according to the thickness (e) of each tray.

And for the positioning and maintenance of cells 64, the passages 65 pass through the entire thickness (e) of the trays 63 and the cells 64 are individually arranged in the successive passages 65 of the stacked trays 63 through which they pass. A lower support plate 69 can support the stack and the cells 64. It may be a cooling plate with additional channels 71 for the circulation of coolant, in thermal exchange with each cell 64, at its base 64*a*; right view FIG. 19 and FIG. 20.

In the version of FIG. 20, channels 11 are all parallel to each other. In the version in FIG. 19, channels 11 extend in several directions (71*a*, 71*b*) so as to cross each other and are staggered in one of the directions, that of 71*b* in the example (top view, FIG. 19).

In connection with a solution shown in FIGS. 19 to 22, another aspect of the invention aims at ensuring particularly fine and efficient thermal management of a vehicle electric battery, such as that 33 in FIG. 1, or that 33' in FIG. 19 with its cylindrical cells, or that 33' in FIGS. 21,22 with its prismatic cells, here rectangular, 64', aligned in at least one direction to form a rectangular parallelepiped with a square or rectangular section.

If WO2017153691 evokes the subject, the solution could be improved.

Thus it is first proposed here as an improved solution, as FIGS. 21, 22, an assembly comprising:
- several structures 1 as already presented, with all or part of their characteristics, and thus individually with composite body 3 or pocket 9 or cover 21,
- several vehicle electric battery cells 64', and
- one said cooling plate 69 arranged in thermal exchange with the cells 64' on said second sides 643 of the latter.

The cooling plate 69 is relatively thermally conductive (e.g., metallic, such as aluminum) and has conduits (here internal) 71 that are connected to one said second supply 73 of a fluid to be circulated in said conduits 71, for surface thermal exchange with the cells 64'. On this subject, one notes that this is also provided for in the solution of FIGS. 19,20. This thermal exchange is called "surface thermal exchange" because the cooling plate 69 is against an outer boundary face of the battery. It is not between two cells, as is the case with structure 1. In the design selected, each cell and the battery as a whole is supported by cooling plate 69.

Moreover, in this solution, between two first opposite sides (respectively 641*a* and 641*b*, FIG. 22) of at least two successive cells 64' there is a space 75 where at least one said structure (1; 3, 9, 21) is interposed, in thermal exchange with the cells, with its depressions 11 forming channels which are connected to one said first supply 77 of a fluid to be circulated in said channels 11, at the heart of the space 75, between the cells 64'. The first and second fluids, respectively of the supplies 77,73, do not cross each other; their circulations are independent; hence the possibility of two different fluids.

If FIG. 22 clearly shows space 75, because of the exploded view, each space is, once the assembly is completed, occupied by at least one structure 1. The structures (1; 3,9,21) and cells 64' are placed one against the other, in a stacking direction (here horizontal). In the selected mode of construction, each space 75 is occupied, from one cell to the next, by two structures 1, a thermal insulating block 79, then two more structures 1.

The second fluid supply 73 will usefully be that of a liquid, such as water, because the sealing and connections are simpler to ensure than for the first supply 77. In addition, this will be more effective when there is "surface thermal exchange". This second fluid supply 73 will also be usefully connected in a closed circuit, via a pump 81; FIG. 21.

After exiting (in 83 FIG. 21) from the said assembly, the conduits of the said first supply 77 can, via a conduit 85 and adapted valves, be looped around the inlet 87, to ensure a recycling of the fluid, even if this means passing it through a thermal exchanger 89, notably to blow at certain times into channels 11 a fluid cold enough to make the PCMs return to the solid state, in a hypothesis of PCMs with two phases: solid and liquid.

The second fluid supply will usefully use a gaseous fluid, such as air. It is preferable that the circulation of this fluid in the assembly be forced (fan or other).

Once again, for a quality of thermal exchange and a well-considered optimization of the thermal management provided by these fluid circulations, in conjunction with the PCMs present, it is recommended that each composite body (3) or pocket (9) present, opposite the cells 64' (but this can also apply, for example, to the 64' cells of the previous solution), a solid (full), continuous surface, 645 for non-discrete thermal exchanges with the cells. It will have been understood that, on the contrary, a discrete contact is like separate zones without a continuum.

Thus, in the previous solution, surfaces 645 were formed by solid (full) cylindrical faces. In the solution of FIGS. 21,22, surfaces 645 are flat, as are at the opposite the walls 641*a* and 641*b* of the cells. Thus, one can foresee that in front of one said cell (64 or 64' for example) each composite body (3) or pocket (9) is plated in surface contact against the cell, without ventilated (forced) circulation of fluid between them.

Crossing the flows of the first and second fluids (always without mixing them) could further improve the efficiency of thermal exchanges.

Moreover, to counter the thermal transfers of one so-called cell 64', it is proposed in the solution for prismatic cells (FIGS. 21,22), to interpose a thermal insulating block 79 between two composite bodies (3) or pockets (9) themselves thus interposed between two so-called cells 64'.

In the solution in FIG. 23, which takes up the characteristics of the previous solution (FIGS. 21, 22), electrical insulation sheets 91 were added, each interposed between one structure 1 and one cell 64'.

The purpose of the electrical insulation sheets 91 is to avoid short circuits if the PCM of the composite bodies (3) or pockets (9) is electrically conductive. It is not obligatory to place this component, depending on the characteristics of the PCM but also on the desired effect: desired or undesired electrical insulation.

If electrical insulation sheets 91 are provided, it will be advantageous for the effectiveness of the electrical insulation that the contact surfaces between the elements 1,91,64' are flat and continuous; hence the advice of flat surfaces on the two opposite sides of the electrical insulation sheets 91 and on the side of structure 1 (composite body 3 or pocket 9) facing the adjacent electrical insulation sheet 91; see FIG. 23.

In FIG. 24, "cooling plates" 69 border on two opposite sides a group of cells 64' considered as a whole. Each cooling plate 69 is presented as a group of tubes, or pipes, 690, parallel to each other and through which circulates a fluid F adapted to be in thermal exchange with the cells 64' through the material of the tubes 690, which may be a synthetic rubber or a metal (e.g., aluminum because it is thermally conductive).

Thus, as above:
- the cells 64' may be thermally managed via the fluid F circulating along them, here in the 690 tubes, and
- through the material of each cooling plate, the cells 64' and the fluid F are in thermal contact.

As in the other examples, the group of cells 64' considered as a whole can thus be thermaled or cooled, depending on the temperature of the circulating fluid and the thermal gradient thus created between the cells 64' and the fluid F.

It will have been understood that tubes 690 correspond to the aforementioned conduits or channels 71.

The tubes 690 may be parallel to each other, either per side or per group.

They may also be arranged facing only one side of a group of cells 64' considered as a whole, as is the case for cooling plate 69 in the example in FIG. 18.

In FIG. 25, another variant of the solution of FIG. 1 has been illustrated, which takes up all the characteristics of the solution, with the following additions, it being specified that, if the view of FIG. 25 is partial, it can be supplemented by symmetry; the missing part completes the visible part identically.

In this solution, battery 33 comprises several assemblys or groups (here two 33a,33b) of cells. Groups 33a,33b of cells 64' are aligned in an X direction. The cells 64' each have electrical connection terminals 331 (anode/cathode).

As in the case of FIG. 1, on several sides, and preferably on an entire perimeter surrounding the groups 33a,33b of cells, extends the box 530, thus with its composite body structures, each containing at least one phase change material (PCM) in a rigid structuring matrix.

Thus, around a group of cells taken together, the structures 1 including PCM will extend favorably on at least two opposite lateral sides (as on the sides shown in section FIG. 18),
- by ensuring a relevant compromise between size and efficiency in terms of thermal barrier, by coupling with one said thermal insulator 61 (or 29),
- and allowing the other sides to be reserved in particular (at least) one for the thermal exchange with the cells (without PCM material), and another for the connection terminals of the cells 1.

At the corners, if necessary, corner blocks 57 crossed by communication passages 59 can however be interposed each between two successive structures 1, to bring them together. The above-mentioned fluid F circulates there.

If necessary, along the relevant sides of the case, blocks 570, crossed by communication passages 590, may be interposed each between two successive structures 1, to join them. The above-mentioned fluid F will circulate there. Blocks 570 can be identical to the corner blocks 57 except for the orientation of the communication passages: axial orientation for those referenced 590, angled orientation for those referenced 59.

Another specificity of this solution is that it includes:
- in addition to the thermal barrier formed by the housing 530:
  - which thus borders on several sides an interior volume in which the cells 64' of the battery are arranged, and
  - whose structures 1 delay or promote the propagation of a thermal flow out of or into the volume,
- one or more thermal exchange element(s) 69, 340 made of metal or polymer and through which a thermal exchange fluid suitable for thermal exchange with the cells circulates, as already explained for element 69 called above cooling plate. As before, the thermal exchange fluid can be either a thermal carrier or a refrigerant.

Thus, even if FIG. 25 does not show it, the thermal exchange elements 340 could be replaced (or even hypothetically completed) by the cooling plate 69, which is placed opposite to a side other than that of terminals 331 and walls 1 of the case, and thus possibly (placed) under the cells, as shown in FIGS. 21-23).

In a solution with thermal management structures 1 (each comprising a composite body) and thermal exchange elements 340 (with or without cooling plate 69), the thermal exchange elements 340 do not contain PCMs: they are not thermal barrier elements but thermal exchangers arranged in "primary" thermal exchange with the cells: directly in contact with them or at least in thermal contact with them and interposed between them and the peripheral thermal management structures 1, except for those of thermal exchange elements 340a (FIG. 25) which may be interposed between two successive groups 33a, 33b of cells and which may contain a thermal insulator and/or a composite body referred to above PCM 5/matrix 7, to break a thermal chain in the event of overthermaling of one said group.

As illustrated in FIGS. 1,25, around the peripheral structures 1, one will usefully find a thermal insulator 61 or 29 (PIV), thus completing the thermal barrier that will first oppose to the external environment 360 at least one layer of thermal insulator, before the PCM(s) of structures 1 come into play.

Concerning the said thermal exchange fluid F, one can have several fluids F1, F2 that do not mix, viz.:
- a first fluid F1 corresponding to the above-mentioned fluid F, for channels 11 (see dotted lines connecting structures 1, FIG. 25), and
- a second fluid F2 (preferably a priori liquid) intended to circulate in the thermal exchange elements 340 or in the cooling plate 69.

One can then imagine transposing the two-circuit solution illustrated in FIG. 21, with:
- the fluid circuit 73, kept if there is a cooling plate 69, or where the fluid would be F2 and the cooling plate 69 would be replaced by the thermal exchange elements 340 (as in FIG. 25 where the bold lines arrowed between elements 340 or between elements 340/340a schematize the passage of the fluid F2 between these elements), and
- circuit 77, where (as FIG. 25) the fluid would be F1 which would circulate in channels 11, not in the core between two cells 64' (as FIG. 21), but in the periphery of the groups of cells considered together, in the thermal management structures 1.

Although the solution with integrated depressions 11 defining by themselves the channel walls 13 is very relevant (mass gain, simple manufacturing process, reduced thickness), structures 1 and/or thermal exchange elements 340/340a and/or cooling plate 69 could be realized, especially in thermal exchange situations with 64' cells (as in the solutions presented in connection with FIGS. 1 and 25):

- without integrated depressions 11, with an individual composite body 3 as above, preferably supplemented by a cover 21 with conduits 350 interposed between them and held in place by a preferably thermally conductive filler 351 (see FIG. 25), or
- with integrated depressions 11, and thus still individually a composite body 3 as mentioned above, preferably supplemented by a cover 21 and interposed between them conduitts 350 placed in the depressions 11 that would hold them (cf. FIG. 26).

The fluid in question (F or F1 above-mentioned) could circulate in these conduits 350.

The invention claimed is:

1. An assembly comprising:
a vehicle battery including battery cells,
a housing surrounding the vehicle battery, and
several structures for thermally managing the battery, individually comprising a phase change material surrounding a conduit suitable for circulating a fluid, the conduits of the several structures being connected to a fluid inlet and a fluid outlet,
wherein:
said several structures define or line side walls of the housing, on respective first sides of the battery cells, and
the assembly further comprises:
thermal exchange elements through which a thermal exchange fluid adapted to thermal exchange with the battery cells can circulate, the thermal exchange elements being interposed between said first sides of the battery cells and said structures,
in which each phase change material is included in a rigid structuring matrix, so that a first composite body is formed which is self-supporting whatever the phase of the phase change material contained, the first composite body being shaped so as locally to present a depression which defines by itself a first channel wall forming said conduit, and,
in which the structures individually comprise a cover comprising:
a second composite body containing at least one phase change material included in a rigid structuring matrix, such that said second composite body is self-supporting regardless of the phase of the phase change material contained, and/or
a plastic or metal bag which is gas-tight and under partial internal vacuum, having a shape maintained by the internal vacuum, the cover being fixed with the second composite body in a fluid-tight manner,
wherein the first composite body is shaped so as locally to present a series of said depressions, the assembly further comprising a sheath for circulating said fluid, which sheath:
is connected to said fluid inlet and fluid outlet,
integrates several elongated protrusions wedged in said several depressions,
is fixed between the cover and the first composite body, transverse to a general direction of elongation of the several elongated protrusions, occupies a closed section between 30% and 100% of a cumulative section of said:
cover and
first composite body, and,
transverse to the general direction of elongation, the several elongated protrusions occupy a minor section of the sheath.

2. The assembly according to claim 1, which comprises blocks each interposed between two of said several structures successively disposed, which join said successive structures and which are traversed, for circulating the fluid, by passages for communication between said conduits of the successive structures.

3. The assembly according to claim 2, wherein the blocks are corner blocks arranged at corners of the housing.

4. The assembly according to claim 1, wherein the cover is shaped to locally have an elongated depression:
which in itself defines a second channel wall suitable for fluid flow, and
which completes and laterally closes the first channel wall at a contact interface.

5. The assembly according to claim 1, wherein the rigid structuring matrix comprises an elastomer or fibers.

6. The assembly according to claim 1, wherein the rigid structuring matrix comprises a graphite felt.

7. The assembly according to claim 1 in which, between two of said battery cells successively disposed there is a space in which is interposed, in thermal exchange with the successive battery cells, at least one of said several structures.

8. The assembly according to claim 1, wherein each first composite body has, on both sides opposite two of the battery cells, a continuous, full surface for non-discrete thermal exchange with said two battery cells.

9. The assembly according to claim 8 in which, opposite one of said two battery cells), each first composite body is in contact against the battery cell, without ventilated fluid circulation between the battery cell and the first composite body.

10. The assembly according to claim 1, in which the housing defines a thermal barrier:
which borders on several sides an interior volume in which said battery cells are disposed, and
whose said several structures which define or line the side walls delay or promote a propagation of a thermal flow out of or towards the interior volume.

11. The assembly according claim 1 which further comprises thermal insulating walls externally lining said several structures, so that the phase change materials are interposed between the first sides of the battery cells and the thermal insulating walls.

12. The assembly according claim 1, wherein:
each of said respective first sides of the battery cells comprises a third side and a fourth side, the third side and the fourth side being opposite to each other, and,
said several structures comprise a first of said structures and a second of said structures which extend parallel to the third side and the fourth side, respectively.

13. The assembly of claim 1, further comprising a cooling plate through which a thermal exchange fluid adapted to be in a thermal exchange with the battery cells can circulate, the cooling plate being disposed, for thermal exchange with the battery cells, facing second sides of the battery cells different from said respective first sides.

14. The assembly of claim 13, wherein the cooling plate is a flexible pocket, a rigid panel, a series of parallel or crossed tubes, each pocket(s), panel or tubes containing a volume adapted to the circulation of said thermal exchange fluid.

15. The assembly of claim 1, wherein the thermal exchange elements is a flexible pocket, a rigid panel, a series of parallel or crossed tubes, each pocket(s), panel or tubes containing a volume adapted to the circulation of said thermal exchange fluid.

* * * * *